United States Patent [19]
Koump

[11] 4,360,057
[45] Nov. 23, 1982

[54] HIGH TEMPERATURE ABRASIVE RESISTANT HEAT EXCHANGER

[75] Inventor: Valentin Koump, Hempfield Township, Westmoreland County, Pa.

[73] Assignee: Westinghouse Electric Corp., Pittsburgh, Pa.

[21] Appl. No.: 232,349

[22] Filed: Feb. 6, 1981

Related U.S. Application Data

[62] Division of Ser. No. 49,688, Jun. 18, 1979, Pat. No. 4,279,293.

[51] Int. Cl.³ .............................................. F28F 9/06
[52] U.S. Cl. ...................................... 165/82; 165/76; 165/139; 165/158; 165/175; 285/20; 285/261
[58] Field of Search ................ 165/158, 76, 173, 175, 165/178, 134 R, 81, 82, 139; 285/19, 20, 160, 261

[56] References Cited

U.S. PATENT DOCUMENTS

| 1,043,451 | 11/1912 | Mosher | 285/160 |
| 1,209,810 | 12/1916 | Caro et al. | 165/149 |
| 1,235,057 | 7/1917 | Roberson | 165/175 X |
| 2,206,414 | 7/1940 | Markey | 285/261 |
| 2,834,581 | 5/1958 | Schefels et al. | 165/139 |
| 3,263,747 | 8/1966 | McKay | 165/175 X |
| 3,292,955 | 12/1966 | Luther | 285/261 |
| 3,610,328 | 10/1971 | La Rue et al. | 165/134 R |
| 3,974,022 | 8/1976 | Lauro | 165/178 X |
| 4,173,615 | 11/1979 | Otsuka et al. | 165/134 R X |
| 4,224,982 | 9/1980 | Frei | 165/173 X |

FOREIGN PATENT DOCUMENTS 565507 11/1944 United Kingdom ................ 285/19

Primary Examiner—Sheldon J. Richter
Attorney, Agent, or Firm—W. E. Otto; Z. L. Dermer

[57] ABSTRACT

A high temperature tube and shell vertically positioned heat exchanger including a plurality of tube sheets dividing the interior of the shell into three consecutive chambers. Ceramic tubes are vertically hung from hemispherical seats in an upper tube sheet and extend downwardly through loose fitting porous inserts which line perforations in the lower tube sheets. A hot fluid flows from the bottom chamber upwardly through the ceramic tubes, a cool fluid flows through the upper chamber across the tubes, and a third fluid is injected into the intermediate chamber at a pressure higher than that of the fluid mediums in the upper and lower chambers. The third, high pressure fluid flows through the porous inserts and into the other chambers forming a dynamic seal which also allows unrestricted axial motion of the tubes and limited lateral motion of the bottom of the tubes.

3 Claims, 3 Drawing Figures

HIGH TEMPERATURE ABRASIVE RESISTANT HEAT EXCHANGER

This is a division of application Ser. No.49,688, filed June 18, 1979, subsequently issued as U.S. Pat. No. 4,279,293.

BACKGROUND OF THE INVENTION

1. Field of the Invention

This invention relates to shell and tube-type heat exchangers, and more particularly to a construction utilizing ceramic components transporting high temperature fluid mediums.

2. Description of the Prior Art

In combined gas turbine-coal gasification generating plant designs, raw fuel gas, prior to being burned in the gas turbines, has to be sufficiently cleaned in order to remove particulate matter and chemical impurities such as $H_2S$, COS, HCN, $CS_2$, HCl, KCl, KOH and $Fe(OH)_2$ to very low levels, as an impure fuel gas detrimentally affects turbine life. Several options for cleaning fuel gas for gas turbine applications are available, or are presently being considered.

For example, the raw fuel gas can be cooled by direct water sprays to a temperature below the boiling point of water, at the operating pressure, and particulate matter and chemical impurities removed by commercially available so-called "wet" processes. Also, raw fuel gas can be cooled in a waste heat boiler, with or without a water quench, then cooled further by direct water sprays, and particulate matter and chemical impurities subsequently removed by commercially available wet processes. Although these processes are presently being utilized commercially, they result in gross generating system inefficiencies because cooling of gas in these systems involves large temperature differences. Also being investigated are processes which remove the particulate matter and chemical impurities directly from the high temperature fuel gas. However, viable commercial technology for high temperature gas cleaning is not presently available.

Another option is to cool the raw fuel gas by heat exchange with a clean fuel gas, followed by further cooling such as by direct water sprays, followed by removal of the particulate matter and chemical impurities by commercially available processes. This latter process appears to have a high potential for widespread use in coal gasification-gas turbine power generating plants. However, associated with use of such high temperature heat exchangers are a number of concerns including the corrosive effect of the chemical impurities in the raw fuel gas on commercially available alloys. Additionally, a high temperature heat exchanger is highly susceptible to erosion of the heat transfer surfaces by particulate matter in the raw fuel gas stream. And, the heat transfer surfaces are further subject to fouling by coal tar deposition and cracking.

The corrosion concerns can be alleviated to some extent by use of exotic metals and metal alloys, primarily for the tubes. Metals and alloys which can withstand the chemical attack are not immune to the erosion by solid particulates in the gas. Ceramic materials, on the other hand, are effectively resistant to both corrosion by chemical impurities and also to erosion by particulate matter, and thus appear to be the most viable alternative. However, practical application of ceramic materials in a high temperature heat exchanger is complicated by the relatively low strength and low ductility of ceramic tubes, as well as the difficulty encountered in fabricating long ceramic tubes which are sufficiently straight. The application is further hampered by the differential thermal expansions between, for example, ceramic tubes and metals used in the construction of a heat exchanger pressure shell. Adequate solutions to these concerns have not appeared.

It is thus desirable to provide a high temperature heat exchanger, particularly for coal gasification-gas turbine applications, which overcomes the discussed concerns. It is further desirable to provide a heat exchanger which effectively utilizes ceramic components, overcoming the strength, ductility, lack of straightness and differential thermal expansion characteristics heretofore detrimentally associated with ceramic components.

SUMMARY OF THE INVENTION

This invention provides a heat exchanger, particularly useful for combined coal gasification-gas turbine application, which allows high temperature heat exchange among fluid mediums, at least one of which is hostile as a result of its chemical nature and containment of chemical impurities and particulate matter. The invention further allows use of ceramic components, effectively alleviating previous limitations resulting from low ductility, low strength, lack of straightness and thermal expansion characteristics of ceramic components for heat exchanger utilization.

In a preferred form the heat exchanger is a vertically oriented tube and shell type. The shell is metallic and the tubes are ceramic, laterally supported along their length by a plurality of tube sheet structures which divide the shell interior into three main chambers. Portions of the tube sheets, such as cylindrical inserts fitting about the ceramic tubes, are porous and flexible. The flexibility of the inserts allows axial expansion and contraction of the tubes without generating excessive stresses, and the porosity of the inserts provides controlled fluid communication between selected chambers.

A contaminated hotter fluid medium, such as raw fuel gas, enters the bottom chamber and passes through the interior of the tubes. A second cooler fluid medium, such as clean fuel gas, passes into and through an upper chamber, across the tubes, absorbing heat from the raw fuel gas. A third intermediate chamber is interposed between the upper and lower chambers, and a clean gaseous medium, which may be the same as the medium in the upper chamber, is injected into the intermediate chamber at a higher pressure than the pressure in either of the other two chambers. This intermediate medium, because of its higher pressure, passes into the other two chambers through the porous inserts, thus forming a dynamic fluid seal between the lower and upper chambers.

The ceramic tubes additionally have integral generally spherical flanges at their upper ends which seat in matingly configured hemispherical perforations in an upper tube sheet so as to form a ball joint type connection. The tubes are thus able to accommodate axial expansion and significant curvature of the ceramic tube without generating excessive stresses, particularly at the flange. The preferred tube material is dense silicon carbide (SiC), and the porous inserts are preferably fabricated from a dense mat of high alloy wire, textured similar to dense steel wool.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
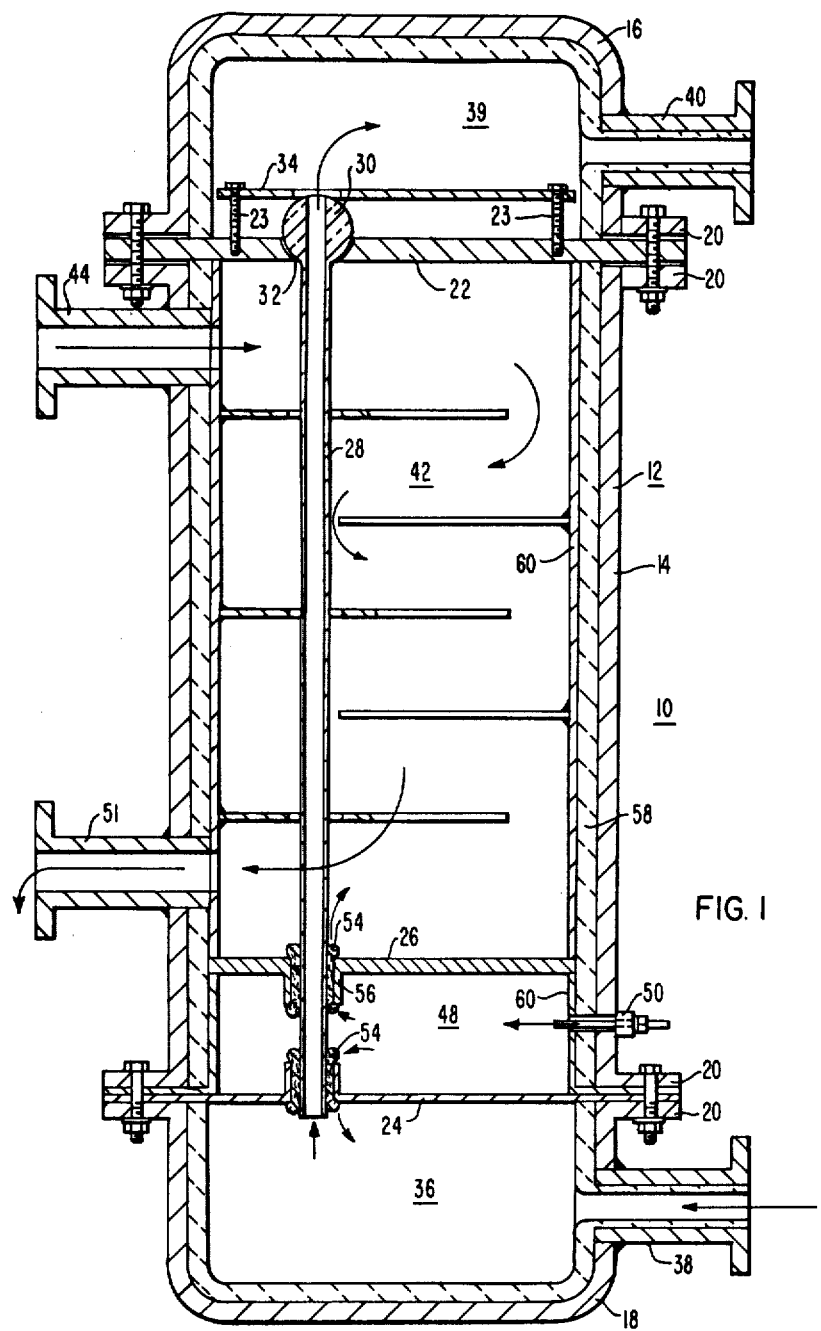
FIG. 1 is a vertical section through a heat exchanger in accordance with the invention.

Referring now to FIG. 1 there is shown a high temperature tube and shell type heat exchanger 10. The shell assembly 12 includes a body 14, upper head 16 and lower head 18. The heads 16, 18 are joined to the body 14 through flanges 20, to form a pressure bearing assembly. An upper 22 and lower 24 perforated tube sheet are preferably supported between the flanges 20, although the tube sheets 22, 24 can alternatively be supported from any of the three components making up the shell assembly 12. An intermediate tube sheet 26 is supported within the shell, preferably closer to the lower tube sheet 24 than to the upper tube sheet 22.

Figure 2:
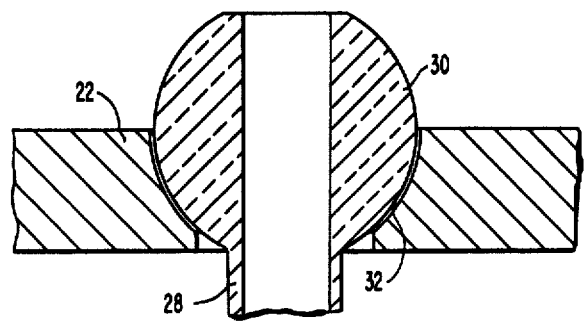
FIG. 2 is a section view of the joint between a tube and tube sheet in accordance with the invention.

A plurality of ceramic tubes 28 (one shown), preferably of dense silicon carbide (SiC), are supported vertically within the shell assembly 12. Tubes comprised of other ceramics such as beryllium oxide, dense alumina, zirconia and its oxides, as well as cermets, mixtures of sintered oxides and metals, can also be utilized. The upper end of each tube includes a generally spherical flange 30, which is integrally formed with the tube 28 and which seats in a matingly configured generally hemispherical perforation 32 in the upper tube sheet 22, as shown in additional detail in FIG. 2. Hemispherical refers to the general shape of, for example, the perforation, although the bottom portion is flattened where the body of the tube 28 passes through. This arrangement provides a ball joint type seat which, coupled with the flexible lateral support of the lower portion of the tube, discussed further below, allows a degree of non-linearity of the ceramic tube 28 so as to alleviate detrimental stresses. A plate 34, preferably affixed to the tube sheet 22 by fasteners 23, is positioned atop the tubes 28 to provide a force which holds the flanges 30 in the perforations 32. The tubes 28 extend downwardly through the intermediate 26 and lower 24 perforated tube sheets.

The tube sheets divide the interior of the shell assembly 12 into a plurality of chambers. A hot first fluid medium, such as raw fuel gas including particulate matter, enters a first chamber 36 through an inlet nozzle 38, flows upwardly through the interior of the tubes 28, and is discharged from an outlet chamber 39 through outlet nozzle 40. A fluid medium to be heated, such as a clean fuel gas, enters a second chamber 42 through an inlet nozzle 44, flows about the tubes, preferably in a serpentine pattern controlled by a plurality of flow baffles 46, absorbing heat energy from the raw gas within the tubes, and is discharged through an outlet nozzle 51. In a typical application, raw fuel gas from, for example, a coal gasification reactor, enters the tubes at approximately 1750° F. and at a pressure of fifteen to forty atmospheres, and is discharged at approximately 650° F.; the clean fuel gas enters the shell assembly 12 at approximately 230° F. and is discharged, for example to a gas turbine, at 1430° F.

Figure 3:
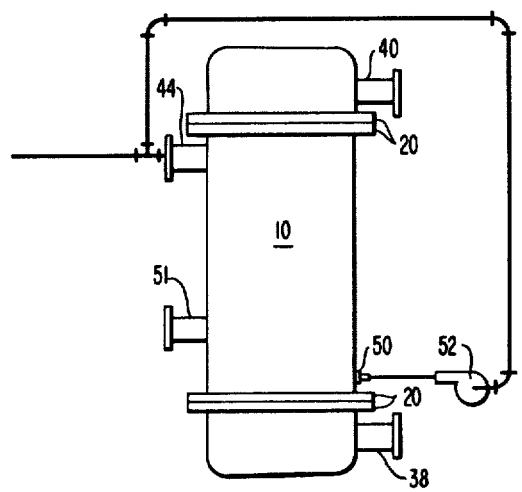
FIG. 3 is a schematic of a portion of a system utilizing a heat exchanger in accordance with the invention.

Interposed between the chambers 36 and 42 is an intermediate chamber 48 bounded by the tube sheets 24, 26. A clean intermediate fluid medium is injected, through inlet nozzle 50, into the intermediate chamber 48 at a pressure which is higher than that in either chamber 36 or chamber 42, preferably at a differential of between two and ten psi. The intermediate medium can, for example, be clean fuel gas at a pressure higher than the fuel gas flowing through chamber 42, for example, comprising a clean cool fuel gas at 230° F. passed through a compressor 52 and then inlet nozzle 50, as shown in FIG. 3.

The primary structure of the tube sheets 24 and 26 is preferably impermeable to the contiguous fluid mediums, and selected portions about the ceramic tubes 28 are permeable to the high pressure medium injected into the chamber 48. The permeable portions preferably take the form of generally cylindrical inserts 54 disposed through perforations 56 in the tube sheets 24, 26. The inserts 54, which can comprise cylindrical components fabricated from wire made from such alloys as, for example, Stellite 6B or Haynes 188 (commercially available from the Cabot Corporation), or Thermalloy 63WC (commercially available from the Abex Corporation) are sized to flexibly receive the ceramic tubes 28 while allowing a degree of axial motion or eccentric position with respect to the tube sheet perforations 56 without developing excessive stresses in the tubes 28. The inserts thus not only provide for substantially unrestrained axial expansion and contraction of the ceramic tubes 28 relative to the shell assembly 12 and affixed components, but also form a dynamic seal preventing direct communication between the chambers above 42 and below 36, the intermediate chamber 48. The lower tube sheets also provide a radial restraint for the bottom portion of the tubes 28. For fabrication, the tubes 28 can be inserted through the perforations 56, and the porous flexible insert material subsequently packed about the tube. The inserts can also be positioned prior to tube insertion. Where high temperature fluids are utilized the outer portions of the insert material may self-weld to the metallic tube sheet perforation during operation. However, no similar reaction will occur between the metallic insert and the ceramic tube, maintaining the flexible relation.

In order to maintain the preferably carbon steel shell assembly 12 at acceptable operational temperatures, an insulating layer 58 is provided, for example, a monolytic refractory such as commercially available mixtures of $Al_2O_3$, MgO and $SiO_2$. To prevent contamination of the clean fuel gas by spalling of the refractory layer 58, the layer 58 is preferably lined with a jacket 60 of high temperature alloy, for example 1N-657 (commercially available from the Huntington Alloys Corporation) or 310 stainless steel, which extends between the tube sheet 22 and tube sheet 26. Other interior portions of the shell assembly 12 can also be lined, such as the intermediate chamber between the tube sheet 26 and the tube sheet 24. The tube sheets, being exposed to high temperature mediums, should also be comprised of similar high temperature alloys.

It will be apparent that the disclosed arrangements can beneficially be applied to a variety of fluid mediums. For example, a dynamic fluid seal in combination with ceramic or metallic tubes can be utilized in processes involving heat exchange among corrosive liquids, such as acids.

Numerous other applications and modifications may be made with the above-described apparatus without departing from the spirit and scope thereof. It therefore is intended that all matter contained in the foregoing description shall be interpreted as illustrative and not in a limiting sense.

I claim:

1. A shell and tube heat exchanger comprising:
   a. a shell;
   b. a plurality of tubes supported within said shell;
   c. tube sheets for defining a first, second and third chamber within said shell and for supporting said tubes, portions of said tube sheets being porous, said third chamber being disposed between said first and second chambers, one of said tube sheets comprising hemispherical indentations;
   d. means for inletting a first fluid medium into said first chamber, said first chamber being in flow communication with the inside of said tubes;
   e. means for flowing a second fluid medium through said second chamber in heat exchange relation with said first fluid;
   f. means for inletting a third fluid medium into said third chamber at a pressure higher than that of said first and second chambers such that said third fluid passes from said third chamber into said first and second chambers through said porous portions;
   said tubes comprising an integral spherical flange matingly configured to said hemispherical indentations in said one tube sheet.

2. The heat exchanger of claim 1 wherein said tubes comprise dense silicon carbide.

3. A vertically oriented shell and tube heat exchanger comprising:
   a. an elongated vertically disposed shell assembly;
   b. an upper tube sheet having a plurality of generally hemispherically shaped perforations;
   c. two lower perforated tube sheets dividing the interior of said shell assembly into a plurality of chambers including a lower inlet chamber, an intermediate chamber and an upper heat exchange chamber, said tube sheets including porous inserts disposed through said perforations;
   d. a plurality of ceramic tubes, the upper portion of each said tube comprising a generally spherical flange matingly sized to seat in a corresponding one of said hemispherical perforations; said tubes extending downwardly through, and sized to be loosely received by, said porous inserts;
   e. means for restraining upward movement of said upper portion of each said tube;
   f. means for flowing a hot fluid medium into said lower chamber and through said tubes;
   g. means for flowing a cool fluid medium through said upper chamber in thermal interexchange with said hot fluid medium; and
   h. means for injecting a third fluid medium into said intermediate chamber at a pressure higher than the pressure within said upper and lower chambers;
   whereby said third fluid flows into said upper and lower chambers forming a dynamic fluid seal which substantially prevents direct communication between said first and second fluid mediums.

* * * * *